United States Patent [19]

Hinney et al.

[11] Patent Number: 5,158,922

[45] Date of Patent: Oct. 27, 1992

[54] PROCESS FOR PREPARING METAL CYANIDE COMPLEX CATALYST

[75] Inventors: Harry R. Hinney, Cross Lanes; Don S. Wardius, Charleston, both of W. Va.

[73] Assignee: Arco Chemical Technology, L.P., Wilmington, Del.

[21] Appl. No.: 831,117

[22] Filed: Feb. 4, 1992

[51] Int. Cl.$^5$ ............................................. B01J 27/26
[52] U.S. Cl. ..................................... 502/175; 502/200
[58] Field of Search .............................. 502/175, 200

[56] References Cited

U.S. PATENT DOCUMENTS

| | | | |
|---|---|---|---|
| 3,278,457 | 10/1966 | Milgrom | 260/2 |
| 3,278,458 | 10/1966 | Belner | 260/2 |
| 3,278,459 | 10/1966 | Johnston | 260/2 |
| 3,301,796 | 1/1967 | Johnston | 260/2 |
| 3,404,109 | 10/1968 | Milgrom | 260/611 |
| 3,427,256 | 2/1969 | Milgrom | 252/431 |
| 3,427,334 | 2/1969 | Belner | 260/429 |
| 3,427,335 | 2/1969 | Herold | 260/429 |
| 3,442,876 | 3/1969 | Herold | 260/80.3 |
| 3,538,043 | 11/1970 | Herold | 260/40 |
| 3,576,909 | 4/1971 | Schmidle et al. | 260/864 |
| 3,726,840 | 4/1973 | Gmitter et al. | 260/79 |
| 3,829,505 | 8/1974 | Herold | 260/611 B |
| 3,900,518 | 8/1975 | Milgrom | 260/573 |
| 3,941,849 | 3/1976 | Herold | 260/613 B |
| 4,239,879 | 7/1981 | Aggarwal et al. | 260/33.4 R |
| 4,242,490 | 12/1980 | Emerson et al. | 528/77 |
| 4,279,798 | 12/1980 | Fabris et al. | 528/76 |
| 4,355,188 | 10/1982 | Herold et al. | 568/620 |
| 4,472,560 | 9/1984 | Kuyper et al. | 526/120 |
| 4,477,589 | 10/1984 | van der Hulst et al. | 502/169 |
| 4,843,054 | 6/1989 | Harper | 502/175 |
| 4,985,491 | 1/1991 | Reisch | 524/875 |
| 5,032,671 | 7/1991 | Harper | 528/357 |

FOREIGN PATENT DOCUMENTS

| | | |
|---|---|---|
| 222453 | 5/1987 | European Pat. Off. . |
| 148957 | 6/1981 | German Democratic Rep. . |
| 203734 | 11/1983 | German Democratic Rep. . |
| 203735 | 11/1983 | German Democratic Rep. . |
| 3-095216 | 4/1991 | Japan . |
| 3-095217 | 4/1991 | Japan . |
| 3-128930 | 5/1991 | Japan . |
| 3-149222 | 6/1991 | Japan . |
| 3-245848 | 11/1991 | Japan . |
| 3-245849 | 11/1991 | Japan . |

OTHER PUBLICATIONS

Herold, *Macromolecular Synthesis*, vol. 5, pp. 9–13 (1974).

Herold et al., *Polymerization Kinetics and Technology, Advances in Chemistry Series*, No. 128, pp. 208–229 (1973).

Livigni et al., *Polyethers, ACS Symposium Series*, No. 6, pp. 20–37 (1975).

Schuchardt et al., *32nd. Annual Polyurethane Technical/Marketing Conference*, Oct. 1–4, 1989, pp. 28–32.

Kuyper et al., *J. Cat.*, 105, 163–174 (1987).

*Primary Examiner*—Patrick P. Garvin
*Assistant Examiner*—Brent M. Peebles
*Attorney, Agent, or Firm*—Stephen D. Harper

[57] ABSTRACT

Highly active double metal cyanide complex catalysts suitable for use in ring-opening polymerization reactions may be prepared in filterable form by controlling the order of reagent addition, the temperature of the reaction medium, and the stoichiometric ratio of the reactants.

20 Claims, No Drawings

PROCESS FOR PREPARING METAL CYANIDE COMPLEX CATALYST

FIELD OF THE INVENTION

This invention relates to a process for the preparation of catalysts of the double metal cyanide complex class.

BACKGROUND OF THE INVENTION

Double metal cyanide complex catalysts are known to be extremely useful and active catalysts for the ring-opening polymerization of heterocyclic monomers such as epoxides. In particular, catalysts of this type have been employed to prepare polyether polyols derived from propylene oxide as described, for example, in U.S. Pat. Nos. 3,404,109, 3,829,505, 3,900,518, 3,941,849, 4,355,188, 5,032,671, and 4,472,560. Double metal cyanide complex catalysts are generally recognized as superior to the caustic catalysts traditionally used to produce polyether polyols for utilization in polyurethane foams, coatings, adhesives, sealants, and elastomers due to the reduced levels of unsaturation and higher functionality of the polyols obtained using such catalysts, as described in U.S. Pat. Nos. 4,239,879, 4,242,490 and 4,985,491.

The double metal cyanide complex catalysts are generally prepared by reacting a metal salt such as zinc chloride with an alkali metal hexacyanometallate such as potassium hexacyanocobaltate in aqueous solution. The resulting water-insoluble double metal cyanide complex catalyst which precipitates from solution must thereafter be recovered from the aqueous reaction medium, washed to remove undesired by-products and impurities, and dried in order to obtain the catalyst in a form suitable for use in a polymerization process. The isolation of the dry, active double metal cyanide complex catalyst is complicated by the extremely fine particle size of the precipitated catalyst, however. Direct filtration by conventional means is not practicable, particularly when the catalyst slurry is treated with an activating organic ligand such as dimethoxyethane. The addition of ligand often greatly increases the viscosity of the slurry such that an intractable gel or paste is formed even with a relatively large volume of liquid present. Centrifugation, dialysis, or conversion to a filterable metal hydroxide species are methods suggested in the literature for accomplishing the isolation. Various methods are described in U.S. Pat. Nos. 3,427,256, 3,941,849, 4,472,560, and 4,477,589. Alternatively, filter-aid particles may be added to the aqueous reaction mixture to facilitate the filtration as described in U.S. Pat. No. 4,843,054. These prior art methods all suffer from certain disadvantages such as the use of sophisticated, expensive, or low capacity equipment, the need for subsequent reaction steps to convert the recovered precipitate to a catalytically active form, or the dilution of the active catalyst with an inert filter-aid. The present invention provides a convenient and effective method of preparing an active double metal cyanide complex catalyst which can be readily isolated by conventional and straight-forward filtration techniques.

SUMMARY OF THE INVENTION

This invention provides a method of preparing a metal cyanide complex catalyst comprising the steps of:

(a) adding a first aqueous solution of a water-soluble metal salt having the formula $M^1(X)_n$, wherein $M^1$ is selected from the group consisting of Zn(II), Fe(II), Co(III), Ni(II), Mn(II), Co(II), Sn(II), Pb(II), Fe(III), Mo(IV), Mo(VI), Al(III), V(IV), V(V), Sr(II), W(IV), W(VI), Cu(II), and Cr(III), X is a first anion selected from the group consisting of halide, hydroxide, sulphate, carbonate, cyanate, thiocyanate, isocyanate, isothiocyanate, carboxylate, oxalate, or nitrate, and n is an integer satisfying the valency state of $M^1$, to a second aqueous solution of a water-soluble metal cyanide salt having the formula $(Y)_a M^2(CN)_b(A)_c$, wherein $M^2$ is the same as or different from $M^1$ and is selected from the group consisting of Fe(II), Fe(III), Co(III), Cr(III), Mn(II), Mn(III), Ir(III), Rh(III), Ru(II), V(IV), V(V), Co(II), and Cr(II), Y is an alkali metal or alkaline earth, A is a second anion that may be the same as or different from X and is selected from the group consisting of halide, hydroxide, sulphate, carbonate, cyanate, thiocyanate, isocyanate, isothiocyanate, carboxylate, oxalate, or nitrate, a and b are each integers of 1 or greater, and a, b, and c are selected so as to provide the overall electroneutrality of the second water-soluble metal cyanide salt, wherein the stoichiometric excess of the metal salt relative to metal cyanide salt is at least about 100%, the temperature of the second aqueous solution during the addition is from about 30° C. to 75° C., and wherein optionally either or both the first and second aqueous solutions contain a first water miscible heteroatom-containing organic ligand selected from the group consisting of alcohols, aldehydes, ketones, ethers, esters, amides, ureas, nitriles, or sulfides, to form an aqueous slurry of particulate metal cyanide complex catalyst produced by reaction of the water-soluble metal salt and the water metal cyanide salt;

(b) combining the aqueous slurry with a second water-miscible heteroatom-containing organic ligand, which may be the same as or different from the first organic ligand and is selected from the group consisting of alcohols, aldehydes, ketones, ethers, esters, amides, ureas, nitriles, or sulphides, said combining step being optional unless neither the first nor the second aqueous solution contain any water-miscible heteroatom-containing organic ligand; and (c) recovering the particulate metal cyanide complex catalyst from the aqueous slurry by filtration.

In a preferred embodiment, this invention provides a method of preparing a metal cyanide complex catalyst comprising the steps of:

(a) adding a first aqueous solution of a water-soluble zinc (II) salt having the formula $Zn(X)_n$, wherein X is a first anion selected from the group consisting of fluoride, chloride, bromide, iodide, sulphate, nitrate, acetyl acetonate, and acetate, and n is an integer satisfying the valency state of the Zn, to a second aqueous solution of a water-soluble metal cyanide salt having the formula $(Y)_a M^2(CN)_b$, wherein $M^2$ is selected from the group consisting of Fe(II), Fe(III), Co(III), Ir(III), Ni(II), and Co(II), Y is selected from the group consisting of Li, Na, K, and Ca, and b is an integer of at least 1 selected so as to provide the overall electroneutrality of the water-soluble metal cyanide salt, wherein the stoichiometric excess of metal salt relative to metal cyanide salt is at least about 150%, the temperature of the second aqueous solution during the addition is from about 30° C. to 60° C., and wherein optionally either or both the first and second aqueous solutions contain a first water-miscible heteroatom-containing organic ligand selected from the group consisting of ethers and ketones, to form an aqueous slurry of particulate metal cyanide complex catalyst produced by reaction of the water-soluble metal salt and the water-soluble metal cyanide salt;

(b) combining the aqueous slurry with a second water-miscible heteroatom-containing organic ligand, which may be the same as or different from the first organic ligand and is selected from the group consisting of ethers and ketones, said combining step being optional unless neither the first nor second aqueous solutions contain any water-miscible heteroatom-containing organic ligand;

(c) recovering the particulate metal cyanide complex catalyst from the aqueous slurry by filtration; and (d) washing the recovered particulate metal cyanide complex catalyst with at least one portion of a washing liquid selected from the group consisting of water-miscible heteroatom-containing organic ligands, water, and mixtures thereof.

DETAILED DESCRIPTION OF THE INVENTION

In one step of the process of this invention, a first aqueous solution of a water-soluble metal salt is added to a second aqueous solution of a water-soluble metal cyanide salt. The water-soluble metal salt has the general empirical formula $M^1(X)_n$, wherein $M^1$ is selected from the group consisting of Zn(II), Fe(II), Ni(II), Mn(II), Co(II), Sn(II), Pb(II), Fe(III), Mo(IV), Mo(VI), Al(III), V(IV), Sr(II), W(VI), Cu(II), and Cr(III). Preferably, $M^1$ is either Zn(II), Fe(II), Co(II), or Ni(II), as double metal cyanide complex catalysts containing these metals tend to have the highest polymerization activity and yield polymeric products having relatively low polydispersity. Most preferably, $M^1$ is Zn(II). The water-soluble metal salt preferably has a solubility in water at 25° C. of at least about 10 g per 100 g water. Mixtures of different water-soluble metal salts may be employed if desired. X is an anion selected from the group consisting of halide (e.g., fluoride, chloride, bromide, iodide), hydroxide (OH), sulphate ($SO_4$), carbonate ($CO_3, CO_3H$), cyanide (OCN), thiocyanate (SCN), isocyanate (NCO), isothiocyanate (NCS), carboxylate (e.g., acetate, propionate), oxalate, or nitrate ($NO_3$). The value of n is selected to satisfy the valency state of $M^1$ and typically is 1, 2, or 3. Examples of suitable metal salts useable in the process of this invention include, but are not limited to, zinc chloride, zinc bromide. zinc iodide, zinc acetate, zinc acetylacetonate, zinc carbonate hydroxide, zinc fluoride, zinc nitrate, zinc sulfate, zinc benzoate, zinc carbonate, zinc citrate, zinc formate, zinc thiocyanate, ferrous chloride, iron (II) sulfate, iron (II) acetate, iron (II) bromide, iron (II) fluoride, iron (II) iodide, iron (II) nitrate, iron (II) thiocyanate, cobalt (II) acetate, cobalt (II) bromide, cobalt (II) chloride, cobalt (II) fluoride, cobalt (II) iodide, cobalt (II) nitrate, cobalt (II) 2,4-pentanedionate, cobalt (II) sulfate, cobalt(II) thiocyanate, nickel (II) bromide, nickel (II) chloride, nickel (II) fluoride, nickel (II) formate, nickel (II) iodide, nickel (II) nitrate, nickel (II) 2,4-pentanedionate, and nickel (II) sulfate. The ratio of water:water-soluble metal salt in the first solution is not critical and can vary depending upon the solubility of the salt, the temperature of the first solution, as well as other factors. Typically, however, the weight ratio employed will be from about 100:1 up to the saturation point (i.e., the maximum possible concentration of the water-soluble metal salt in water). If zinc chloride is used as the water-soluble metal salt, it is generally desirable that the water:zinc chloride weight ratio be from about 10:1 to 1:2. For practical reasons, it is usually preferred to use a relatively small quantity of water in order to reduce the volume of the first aqueous solution which must be handled.

The water-soluble metal cyanide salt in the second aqueous solution preferably has the general formula $(Y)_a M^2(CN)_b(A)_c$ wherein $M^2$ is the same as or different from $M^1$ and is selected from the group consisting of Fe(II), Fe(III), Co(III), Cr(III), Mn(II), Mn(III), Ir(III), Rh(III), Ru(II), V(IV), V(V), Co(II), and Cr(II). Preferably, $M^2$ is either Co(II), Co(III), Fe(II), Fe(III), Cr(III), Ir(III), or Ni(II) as catalysts containing these metals tend to have the highest polymerization activity and to yield polyether polyols having desirably narrow molecular weight distributions (e.g., low polydispersity). Most preferably, $M^2$ is Co(III). More than one metal may be present in the metal cyanide salt (e.g., potassium hexacyano cobalt (II) ferrate(II)). The water-soluble metal cyanide salt preferably has a solubility in water at 25° C. of at least about 1 g per 100 g water. Mixtures of different water-soluble metal cyanide salts may be employed, if desired. Y is an alkali metal (e.g., Li, Na, K) or alkaline earth (e.g., Ca, Ba). A is a second anion that may be the same as or different from X in the water-soluble metal salt and is selected from the group consisting of halide, hydroxide, sulfate, carbonate, cyanate, thiocyanate, isocyanate, isothiocyanate, carboxylate, oxalate, or nitrate. Both a and b are integers of 1 or greater, wherein a, b, and c are selected so as to provide the overall electroneutrality of the water-soluble metal cyanide salt. Preferably, c is 0. In most instances, b corresponds to the coordination number of $M^2$ and is usually 6. Examples of suitable water-soluble metal cyanide salts useable in the process of this invention include, but are not limited to, potassium hexacyanocobaltate (III) (the most preferred metal cyanide salt), potassium hexacyanoferrate (II), potassium hexacyanoferrate (III), potassium hexacyanocobalt (II) ferrate (II), sodium hexacyanocobaltate (III), sodium hexacyanoferrate (II), sodium hexacyanoferrate (III), potassium hexacyanoruthenate (II), calcium hexacyanocobaltate (III), potassium tetracyanonickelate (II), potassium hexacyanochromate (III), potassium hexacyanoiridate (III), calcium hexacyanoferrate (II), potassium hexacyanocobaltate (II), calcium hexacyanoferrate (III), and lithium hexacyanocobaltate (III). The ratio of water:soluble metal cyanide salt in the second solution is not critical and can vary depending upon the solubility of the salt, the temperature of the second solution, as well as other factors. Typically, however, the weight ratio employed will be from about 200:1 up to the saturation point (i.e., the maximum possible concentration of the metal cyanide salt in water). If an alkali metal salt of hexacyanocobaltate is used as the cyanide salt, it is generally desirable that the water:hexacyanocobaltate salt weight ratio be from about 75:1 to 20:1. For practical reasons, it is usually preferred to use a minimum quantity of water in order to reduce the volume of the second aqueous solution which must be handled, as well as the total volume of the slurry obtained upon mixing the first and second aqueous solutions. However, sufficient water must be present to lower the slurry viscosity so as to facilitate stirring, pumping, and filtration of the slurry.

To obtain a double metal cyanide complex catalyst having reproducibly high polymerization activity, it is critical that an excess of the water soluble metal salt be employed relative to the amount of metal cyanide salt.

At least a portion of the excess water soluble metal salt is retained in the complex catalyst upon isolation and appears to function as a promoter or co-catalyst. Not only is the productivity of the resulting catalyst higher when excess metal salt is present, but initiation (activation) times are advantageously shorter and the polydispersity of the resulting polymeric product tends to be desirably lower. In addition, the use of excess metal salt yields catalyst exhibiting a reduced tendency to deactivate during polymerization. For these reasons, at least about a 100% stoichiometric excess of the metal salt relative to metal cyanide salt is utilized. More preferably, the stoichiometric excess is at least about 150%. When zinc chloride is the metal salt and potassium hexacyanocobaltate is the metal cyanide salt, for example, the molar ratio of zinc chloride:potassium hexacyanocobaltate must therefore be at least 3:1 (100% stoichiometric excess) and more preferably is at least 3.75:1 (the stoichiometric reaction of these reagents requires a 3:2 molar ratio).

To improve the filterability of the double metal cyanide complex catalyst produced by reaction of the water-soluble metal salt and the water-soluble metal cyanide salt, it is critical that the first aqueous solution be added to the second aqueous solution. For reasons that are not well understood, this particular order of addition leads to the formation of catalyst particles which are much more readily recovered by filtration than if the addition order is reversed. At the same time, the polymerization activity of the catalyst is not adversely affected. This result was completely unexpected, since the prior art teaches that more active catalysts are obtained by adding the alkali metal hexacyanometallate to a metal salt solution (see col. 16, lines 4-7 of U.S. Pat. No. 3,829,505 for example). The temperature of the second aqueous solution during the addition is similarly critical and must be maintained between 30° C. and 75° C. in order to produce catalyst which may be readily recovered from the aqueous solution by filtration. At ambient temperatures (20°-25° C.), the catalyst slurry obtained tends to clog the pores of the filter medium. At higher temperatures the catalyst may become deactivated. Although the temperature of the first aqueous solution during addition is not critical, it is desirable that this solution also be maintained at a temperature somewhat above ambient so that the temperature of the second aqueous solution is easier to control when the two solutions are combined.

Preferably, the first aqueous solution is added to the second aqueous solution in a continuous or semi-continuous manner with vigorous agitation of the second aqueous solution so as to promote good mixing of the solutions and to maintain a temperature within the desired range. Although the first aqueous solution preferably is not added all at once or at too rapid a rate, since poor mixing or inadequate temperature control may result (especially on a large scale), the precise rate of addition is not critical. Addition times of from about 10 minutes to 10 hours are generally suitable, depending upon the reactants employed, the reactant concentrations, agitation rate, and other variables. Any appropriate reaction vessel having a means by which the first aqueous solution may be introduced and a means for maintaining the contents at a 30°-75° C. temperature can be utilized. The reaction of the metal salt and metal cyanide salt can be performed at any pressure; for convenience, atmospheric pressure is preferred. The reactant solutions may be under an atmosphere of air, oxygen, nitrogen, argon, or any other gas. The reaction of the metal salt and the metal cyanide salt to form a precipitate of the metal cyanide catalyst is normally quite rapid at 30°-75° C. It may be desirable under some circumstances to permit the combined solutions to mix or stand for some period of time (for example, 5 minutes to 24 hours) before proceeding with the next step of the process.

Optionally, either or both of the first and second aqueous solutions contain a water miscible heteroatom-containing organic ligand. If neither aqueous solution contains such a ligand, then the aqueous slurry of catalyst produced by reaction of the metal salt and the metal cyanide salt is combined with a ligand of this type. Of course, portions of the ligand may be present in either the first or second aqueous solutions (or both) with additional portions combined with the aqueous slurry. The ligand provides even further activation of the double metal cyanide complex catalyst. The polydispersity of the polymeric product obtained by polymerizing a cyclic monomer in the presence of the catalyst can also be affected by the ligand. Any of the heteroatom-containing organic ligands taught in the double metal cyanide complex catalyst prior art can be utilized in the process of this invention. Such ligands are taught in U.S. Pat. Nos. 3,427,256, 3,427,334, 3,427,335, 3,278,459, 3,404,109, 3,829,505, 3,900,518, 3,941,849, 4,355,188, 4,477,589, and 4,472,560, for example; these patents are incorporated by reference herein in their entirety. Classes of water miscible heteroatom-containing organic ligands generally useful in the process of this invention include, but are not limited to, alcohols, aldehydes, ketones, ethers, esters, amides, ureas, nitriles, and sulfides. Particularly desirable for use are the ketone and ether-type ligands, especially those compounds having more than one oxygen atom and which are capable of forming chelate bonds with either $M^1$ or $M^2$. Specific examples of suitable ligands include, but are not limited to methanol, ethanol, propanol, isopropanol, butanol, hexanol, octanol, t-butyl alcohol; formaldehyde, acetaldehyde, propionaldehyde, butyraldehyde, i-butyraldehyde, glyoxal, benzaldehyde, tolualdehyde, acetone, methyl ethyl ketone, 3-pentanone, 2-pentanone, 2-hexanone, 2,4-pentanedione, 2,5-hexanedione, 2,4-hexanedione, m-dioxane, p-dioxane, trioxymethylene, paraldehyde, ethyl ether, 1-ethoxy pentane, bis(b-chloro-ethyl) ether, bis(b-ethoxy ethyl) ether or diglyet, butyl ether, ethyl propyl ether, bis-(b-methoxy ethyl) ether, ethylene glycol dimethyl ether, triethylene glycol dimethyl ether, dimethoxy methane, acetal, methyl propylether, diethoxymethane, octaethylene glycol dimethyl ether, formamide, acetamide, propionamide, butyramide, valeramide, N,N'-dimethylacetamide, amyl formate, ethyl formate, n-hexyl formate, n-propyl formate, ethyl ethanoate, methyl acetate, methyl propionate, triethylene glycol diacetate, acetonitrile, propionitrile, butyronitrile, dimethyl sulfide, diethyl sulfide, dibutyl sulfide, dipropyl sulfide, diamyl sulfide, 1,1,3,3-tetramethylurea, and 1,1,3,3-tetraethylurea. Glyme (dimethoxy ethane) and diglyme (diethylene glycol dimethyl ether) are especially preferred ligands. The ligand is preferably a liquid at room temperature (25° C.), has a solubility in water of at least about 1 gram per 100 mL water, and has a boiling point at atmospheric pressure of less than 200° C. (preferably, less than 125° C.).

The amount of ligand is not critical to the successful operation of the process of this invention, but the filtration rate of the catalyst slurry will generally be improved when the overall molar ratio of organic ligand-:water-soluble metal cyanide salt is not greater than about 50:1. However, at least about 1 equivalent of ligand per equivalent of $M^2$ is preferably employed in order to sufficiently activate the resulting catalyst.

The aqueous slurry containing the particulate metal cyanide complex catalyst and the water miscible heteroatom-containing organic ligand may be either filtered immediately to isolate the catalyst particles or allowed to stand or stir for some period of time (typically, up to 24 hours) before filtration. The slurry may be filtered using any appropriate method. Due to the high filterability of the aqueous catalyst slurries produced by the process of this invention, special techniques or equipment are not necessary. Fast filtration rates and complete recovery of the catalyst particles are easily attained.

Suitable methods for separating particulate solids from a liquid medium are described, for example, in "Filtration", *Chemical and Process Technology Encyclopedia*, McGraw Hill, p 487 and "Filtration", *Kirk-Othmer Encyclopedia of Chemical Technology*, 3rd Ed., Vol. 10, p. 284; the teachings of these publications are incorporated by reference herein in their entirety. Cake filtration techniques wherein the particulate catalyst forms a filter cake on the surface of a filter medium are generally preferred for use. The filter medium may be, for example, woven fabric, wire cloth, or a non-woven material such as paper or felt. The filtration apparatus employed can be a batch pressure filter such as a leaf-type pressure vessel filter, filter press, or variable volume press. A continuous pressure filter such as a filter belt press or rotary unit can also be utilized. Also appropriate for use are horizontal basket centrifugal filters, batch vacuum filters, continuous vacuum filters, disc filters, drum filters, horizontal filters, and bag or sock filters. Precoating techniques whereby the initial filtrate is recirculated through the filter cake formed in order to remove any minor amount of unretained catalyst may also be useful. Although a filter aid such as diatomaceous earth could be admixed with the slurry or used to form a precoat, a distinct advantage of the process of this invention is that the use of a filter aid is not needed when filtering the catalyst produced thereby.

The filtered double metal cyanide complex catalyst may subsequently be washed with either water, an additional portion (or portions) of water-miscible heteroatom-containing organic ligand, or a mixture of water and ligand. The reaction of the metal salt and metal cyanide salt forms a water-soluble by-product salt such as potassium chloride. While minor amounts of this by-product salt can be present in the isolated catalyst without greatly affecting catalyst activity, it generally is thought to be desirable to remove most of the by-product salt. However, excessive washing with water should be avoided since the excess unreacted metal salt (e.g., zinc chloride) may also be substantially washed out, resulting in a less than optimum catalyst composition. At the same time, the filtered catalyst may be more readily dried if the excess water is removed by washing with additional organic ligand (which preferably is more volatile than water) so as to displace the water. For these reasons, it is generally desirable to wash the filtered catalyst with either ligand alone or a mixture of ligand and water.

The washed, catalyst subsequently may be dried and crushed, if necessary, to yield a highly active catalyst in powder form appropriate for use in a ring-opening polymerization reaction. One of the distinct advantages of the process of this invention is that the filter cakes obtained are typically much easier to crush into a fine powder than catalysts prepared using prior art methods. Drying to remove excess ligand and/or water retained in the catalyst may be accomplished by simply air drying at ambient temperature, by subjecting the catalyst to a vacuum or by heating it in air or in an inert atmosphere at a temperature up to about 100° C. It is preferred to dry under a vacuum (e.g., 0.1–10 mm Hg) at low temperature (15°–40° C.) since excessive drying tends to deactivate the catalyst. The catalysts of highest activity retain some water and ligand. Catalysts produced by the process of this invention are storage-stable and exhibit little tendency to deactivate upon prolonged exposure to air at ambient conditions.

The catalyst obtained by the process of this invention may be used in any of the polymerization reactions known in the art wherein double metal cyanide complex catalysts have been employed. Such reactions are described, for example, in U.S. Pat. Nos. 3,427,256, 3,427,334, 3,427,335, 3,301,796, 3,442,876, 3,278,457, 3,278,458, 3,278,459, 3,404,109, 3,829,505, 3,900,518, 3,941,849, 4,355,188, 3,538,043, 3,576,909, 4,279,798, 5,032,671, 3,726,840, and 4,472,560 as well as EP 222,453, and East German Pat. Nos. 148,957, 203,734, and 203,735, the teachings of which are incorporated herein by reference in their entirety.

Examples of catalysts which may be prepared by the process of the present invention include:
zinc hexacyanoferrate(III),
zinc hexacyanoferrate(II),
nickel(II)hexacyanoferrate(II),
nickel(II)hexacyanoferrate(III),
zinc hexacyanoferrate(III)hydrate,
cobalt(II)hexacyanoferrate(II),
nickel(II)hexacyanoferrate(III)hydrate,
ferrous hexacyanoferrate(III),
cobalt(II)hexacyanocobaltate(III),
zinc hexacyanocobaltate(III),
zinc hexacyanomanganate(II),
zinc hexacyanochromate(III),
zinc iodopentacyanoferrate(III),
cobalt(II)chloropentacyanoferrate(II),
cobalt(II)bromopentacyanoferrate(II),
iron(II)fluoropentacyanoferrate(III),
iron (III) hexacyanocobaltate (III),
zinc chlorobromotetracyanoferrate(III),
iron(III)hexacyanoferrate(III),
aluminum dichlorotetracyanoferrate(III),
molybdenum(IV)bromopentacyanoferrate(III),
molybdenum(VI)chloropentacyanoferrate(II),
vanadium(IV)hexacyanochromate(II),
vanadium(V)hexacyanoferrate(III),
strontium(II)hexacyanomanganate(III),
zinc hexacyanocobalt (II) ferrate (II),
tungsten(IV)hexacyanovanadate(IV),
aluminum chloropentacyanovanadate(V),
tungsten(VI)hexacyanoferrate(III),
manganese(II)hexacyanoferrate(II),
chromium(III)hexacyanoferrate(III),
zinc hexacyanoiridate(III),
nickel(II)hexacyaniridate(III),
cobalt(II)hexacyanoiridate(III),
ferrous hexacyanoiridate(III).

Other cyanide complexes which can be employed are those such as

Zn[Fe(CN)₅NO], Zn₃[Fe(CN)₅NO₂]₂
Zn[Fe(CN)₅CO], Zn[Fe(CN)₅H₂O], Fe[Fe(CN)₅OH]
Cr[Fe(CN)₅NCO], Cr[Fe(CN)₅NCS]
Al[Co(CN)₅NCO], Ni₃[Mn(CN)₅CNS]₂
and the like. Mixtures of the above compounds can also be prepared. For example, catalyst mixtures containing both Fe(II) and Fe(III) hexacyanometalate anions are particularly useful.

It is to be understood that the double metal cyanide complex catalyst obtained by practice of this invention normally will include certain amounts of organic ligand, water, and excess water-soluble metal salt, each of which may be beneficial in promoting high catalytic activity as well as low polydispersity and low levels of unsaturation in a polyether polyol product prepared using the catalyst. Typically, the catalyst obtained will correspond to the general formula $$w(DMC) \cdot x(L) \cdot y[M_1(X)_n] \cdot z(H_2O)$$

wherein DMC is the double metal cyanide portion of the catalyst, L is the organic ligand, $M^1(X)_n$ is the water-soluble metal salt, w is 1, x is from about 0.5 to 10, y is from about 0.2 to 3.0, and z is from about 1.0 to 10.0.

Without further elaboration, it is believed that one skilled in the art can, using the preceding description, utilize the present invention to its fullest extent. The following examples therefore, are to be considered as merely illustrative and not limitative of the claims or remainder of the disclosure in any way whatsoever.

EXAMPLE 1

This example demonstrates the preparation of a double metal cyanide complex catalyst using the process of this invention. A solution of zinc chloride (26.65 g; 0.1956 mole) in water (26.65 g) was added rapidly to a well-agitated solution of potassium hexacyanocobaltate (13.00 g, 0.0391 mole) in water (263.35 g). The potassium hexacyanocobaltate solution was maintained at 40° C. during addition of the zinc chloride solution. A colorless precipitate of zinc hexacyanocobaltate particles formed immediately upon addition. After stirring for 15 minutes at 40° C., dimethoxyethane (84.00 g; 0.9321 mole) was added to the aqueous catalyst slurry. The resulting mixture was stirred for an additional 30 minutes and the zinc hexacyanocobaltate zinc chloride.-dimethoxyethane.water complex catalyst recovered by filtration using a horizontal basket centrifugal filter and a light weight nylon fabric filter medium. The filtration rate was relatively fast with minimal clogging of the pores of the filter medium. After washing with 300 mL dimethoxyethane and drying in air at ambient temperature and pressure, the filter cake obtained was quite soft and could be easily crushed to a fine powder.

EXAMPLE 2

To demonstrate that the time period over which the water-soluble metal salt solution is added to the water-soluble metal cyanide salt solution is not critical to the successful operation of the process of this invention, the procedure of Example 1 was repeated with the exception that the zinc chloride solution was added incrementally over 60 minutes. A double metal cyanide complex catalyst which could be readily recovered by filtration and which required little effort to convert to a fine, free-flowing powder was obtained.

COMPARATIVE EXAMPLES 3-5

These examples illustrate the importance of maintaining the metal cyanide salt solution at an elevated temperature. In Comparative Example 3, the procedure of Example 1 was repeated with the exception that the temperature during addition of the metal salt solution and the dimethoxyethane was 4° C. instead of 40° C. In Comparative Example 4, the addition temperature was 22° C. (the procedure of Example 1 was otherwise followed). In Comparative Example 5, the procedure of Example 2 was repeated with the exception that the temperature during addition of the zinc chloride solution and the dimethoxyethane was 22° C. instead of 40° C. In each case, the resulting slurry of double metal cyanide complex catalyst was exceedingly difficult to filter due to partial clogging of the pores of the filter medium. Additionally, the catalyst filter cakes obtained were quite hard and brittle and could not be readily crushed to a powder.

COMPARATIVE EXAMPLE 6

The criticality of the order in which the reagents are combined is illustrated in this example. Comparative Example 4 was repeated with the exception that the potassium hexacyanocobaltate solution was added to the zinc chloride solution. A catalyst slurry having the consistency of thick paste was obtained; filtration was very slow because of the substantially complete plugging of the pores of the filter medium. The filter cake of catalyst was hard and brittle.

EXAMPLE 7

To demonstrate the use of a higher addition temperature, the procedure of Example 1 is repeated except that the solution of potassium hexacyanocobaltate is maintained at 60° C. during addition of the zinc chloride solution.

EXAMPLES 8-9

To demonstrate the use of other zinc halide salts, the procedure of Example 1 is repeated except that in Example 8 zinc bromide (44.05 g) in water (50 g) is substituted for the zinc chloride solution and in Example 9 zinc iodide (62.43 g) in water (65 g) is substituted for the zinc chloride solution.

EXAMPLES 10-17

To demonstrate the use of other organic ligands, the procedure of Example 1 is repeated except that ethylene glycol dimethyl ether (Example 10), 1,3-dimethoxypropane (Example 11), dioxane (Example 12), tetrahydrofuran (Example 13), acetone (Example 14), diethoxyethane (Example 15), 1,1,3,3-tetramethyl urea (Example 16), or 2,5-hexanedione (Example 17) is substituted for the dimethoxyethane.

EXAMPLES 18-19

To demonstrate alternative ways in which the organic ligand may be utilized in the process of the invention, the procedure of Example 1 is repeated except that 21 g of the dimethoxyethane is present in the potassium hexacyanocobaltate solution prior to addition of the zinc chloride solution (Example 18). In Example 19, all of the dimethoxyethane is present initially in the potassium hexacyanocobaltate solution.

EXAMPLES 20-22

To demonstrate the use of other metal cyanide salts, the procedure of Example 1 is repeated except for the substitution of an equimolar amount of either potassium hexacyanoferrate (III) (Example 20), potassium hexacyanochromate (III) (Example 21), $Ca_3[Co(CN)_6]_2$ (Example 22; 0.01955 mole) or potassium hexacyanoiridate (III) (Example 23) for the potassium hexacyanocobaltate.

EXAMPLES 24-29

To demonstrate the use of other water-soluble metal salts, the procedure of Example 1 is repeated except for the substitution of an equimolar amount of either zinc nitrate (Example 24), zinc sulfate (Example 25), zinc acetate (Example 26), ferric chloride (Example 27), cobalt (II) chloride (Example 28), or nickel (II) chloride (Example 29) for the zinc chloride.

EXAMPLE 30

The use of a metal cyanide complex catalyst prepared in accordance with the process of the invention in an epoxide polymerization reaction is demonstrated in this example. A one liter autoclave is charged with the catalyst of Example 1 (0.30 g), propoxylated trimethylolpropane (470 molecular weight; 21.5 g), and tetrahydrofuran (145 mL). After sealing the autoclave under a blanket of nitrogen and heating the contents to 90° C., an initial charge of propylene oxide (39 g) is added with good stirring. An additional portion of propylene oxide (503 g) is added over 9 hours after a pressure drop is observed indicating that the catalyst has been activated and the initial charge of propylene oxide consumed. The mixture is heated for an additional 3 hours at 90° C. and then stripped of volatiles under vacuum to yield a polyoxypropylene triol having a molecular weight of about 12,000, a hydroxy number of about 16 mg KOH/g, and less than about 0.02 meq/g unsaturation.

We claim:

1. A method of preparing a metal cyanide complex catalyst comprising the steps of:
   (a) adding a first aqueous solution of a water-soluble metal salt having the formula $M^1(X)_n$, wherein $M^1$ is selected from the group consisting of Zn(II), Fe(II), Co(III), Ni(II), Mn(II), Co(II), Sn(II), Pb(II), Fe(III), Mo(IV), Mo(VI), Al(III), V(IV), V(V), Sr(II), W(IV), W(VI), Cu(II), and Cr(III); X is a first anion selected from the group consisting of halide, hydroxide, sulphate, carbonate, cyanate, thiocyanate, isocyanate, isothiocyanate, carboxylate, oxalate, or nitrate; and n is an integer satisfying the valency state of $M^1$, to a second aqueous solution of a water-soluble metal cyanide salt having the formula $(Y)_a M^2(CN)_b(A)_c$, wherein $M^2$ is the same as or different from $M^1$ and is selected from the group consisting of Fe(II), Fe(III) Co(III), Cr(III), Mn(II), Mn(III), Ir(III), Rh(III), Ru(II), V(IV), V(V), Co(II), and Cr(II); Y is an alkali metal or alkaline earth, A is a second anion that may be the same as or different from X and is selected from the group consisting of halide, hydroxide, sulphate, carbonate, cyanate, thiocyanate, isocyanate, isothiocyanate, carboxylate, oxalate, or nitrate; a and b are each integers of 1 or greater; and a, b, and c are selected so as to provide the overall electroneutrality of the water-soluble metal cyanide salt, wherein the stoichiometric excess of the water soluble metal salt relative to water soluble metal cyanide salt is at least about 100%, the temperature of the second aqueous solution during the addition is from about 30° C. to 75° C., and wherein either or both of the first and second aqueous solutions optionally contain a first water miscible heteroatom-containing organic ligand selected from the group consisting of alcohols, aldehydes, ketones, ethers, esters, ureas, amides, nitriles, or sulfides, to form an aqueous slurry of particulate metal cyanide complex catalyst produced by reaction of the water-soluble metal salt and the water-soluble metal cyanide salt;
   (b) combining the aqueous slurry with a second water-miscible heteroatom-containing organic ligand, which may be the same as or different from the first organic ligand and is selected from the group consisting of alcohols, aldehydes, ketones, ethers, esters, amides, ureas, nitriles, or sulphides, said combining step being optional unless neither the first nor the second aqueous solution contained any water-miscible heteroatom-containing organic ligand; and
   (c) recovering the particulate metal cyanide complex catalyst from the aqueous slurry by filtration.

2. The method of claim 1 wherein $M^1$ is selected from the group consisting of Zn(II), Fe(II), Co(II), and Ni(II).

3. The method of claim 1 wherein X is selected from the group consisting of halide, sulphate, and nitrate.

4. The method of claim 1 wherein Y is selected from the group consisting of Li, Na, K, and Ca.

5. The method of claim 1 wherein $M^2$ is selected from the group consisting of Co(II), Co(III), Fe(II), Fe(III), Cr(III), Ir(III), and Ni(II).

6. The method of claim 1 wherein b is 6 and c is 0.

7. The method of claim 1 comprising the additional step of washing the recovered particulate metal cyanide complex catalyst with at least one portion of a washing liquid selected from the group consisting of water-miscible heteroatom-containing organic ligands, water, and mixtures thereof.

8. The method of claim 1 comprising the additional step of drying the recovered particulate metal cyanide complex catalyst.

9. The method of claim 1 wherein the first and second water-miscible heteroatom-containing organic ligands are ethers or ketones.

10. A method of preparing a metal cyanide complex catalyst comprising the steps of:
    (a) adding a first aqueous solution of a water-soluble zinc (II) salt having the formula $Zn(X)_n$, wherein X is a first anion selected from the group consisting of fluoride, chloride, bromide, iodide, sulphate, nitrate, acetyl acetonate, and acetate, and n is an integer satisfying the valency state of the Zn, to a second aqueous solution of a water-soluble metal cyanide salt having the formula $(Y)_a M^2(CN)_b$, wherein $M^2$ is selected from the group consisting of Fe(II), Fe(III), Co(III), Ir(III), Ni(II), and Co(II), Y is selected from the group consisting of Li, Na, K, and Ca, and b is an integer of at least 1 selected so as to provide the overall electroneutrality of the water-soluble metal cyanide salt, wherein the stoichiometric excess of the water-soluble metal salt relative to the water soluble metal cyanide salt is at least about 150%, the temperature of the second aqueous solution during the addition is from about 30° C. to 60° C., and wherein either or both the first and second aqueous solutions optionally contain a first water-miscible heteroatom-containing organic ligand selected from the group consisting of ethers and ketones, to form an aqueous slurry of particulate metal cyanide complex catalyst produced by reaction of the water-soluble metal salt and the water-soluble metal cyanide salt;

(b) combining the aqueous slurry with a second water-miscible heteroatom-containing organic ligand, which may be the same as or different from the first organic ligand and is selected from the group consisting of ethers and ketones, said combining step being optional unless neither the first nor second aqueous solutions contain any water-miscible heteroatom-containing organic ligand;

(c) recovering the particulate metal cyanide complex catalyst from the aqueous slurry by filtration; and (d) washing the recovered particulate metal cyanide complex catalyst with at least one portion of a washing liquid selected from the group consisting of water-miscible heteroatom-containing organic ligands, water, and mixtures thereof.

11. The method of claim 10 comprising the additional step of drying the washed particulate metal cyanide complex catalyst.

12. The method of claim 10 wherein n is 2 and X is Cl.

13. The method of claim 10 wherein Y is K, $M^2$ is Co(III), a is 3, and b is 6.

14. The method of claim 10 wherein the addition time during step (a) is from about 10 minutes to 10 hours.

15. The method of claim 10 wherein the water-miscible heteroatom-containing organic ligand in steps (a), (b), and (d) is an aliphatic ether containing at least two ether oxygen atoms.

16. The method of claim 10 wherein the overall molar ratio of organic ligand:water soluble metal cyanide salt in steps (a) and (b) is not greater than about 50:1.

17. A method of preparing a metal cyanide complex catalyst comprising the steps of:

(a) adding a first aqueous solution of zinc chloride to a second aqueous solution of potassium hexacyanocobaltate over a period of from about 10 minutes to 10 hours, wherein the molar ratio of zinc chloride:potassium hexacyanocobaltate is at least about 3.75:1 and the temperature of the second aqueous solution during the addition is from about 30° C. to 60° C., to form an aqueous slurry of particulate metal cyanide complex catalyst produced by reaction of the zinc chloride and potassium hexacyanocobaltate;

(b) combining the aqueous slurry with at least one organic ligand selected from the group consisting of glyme, diglyme, triglyme, dioxane, tetrahydrofuran, acetone, 1,3-dimethoxypropane, diethoxyethane, propylene glycol dimethyl ether, 1,1,3,3-tetramethylurea, 2,5-hexanedione, and acetylacetone, wherein the molar ratio of organic ligand:potassium hexacyanocobaltate is not greater than about 50:1;

(c) recovering the particulate metal cyanide complex catalyst from the aqueous slurry by filtration;

(d) washing the recovered particulate metal cyanide complex catalyst with at least one additional portion of the organic ligand so as to substantially remove the excess water from the recovered particulate metal cyanide complex catalyst; and (e) drying the washed particulate metal cyanide catalyst.

18. The method of claim 17 wherein drying step (e) is carried out at a temperature of from 15° C. to 40° C.

19. The method of claim 17 wherein the organic ligand is glyme or diglyme.

20. The method of claim 17 wherein the metal cyanide complex catalyst obtaining after drying step (e) has the general formula $Zn_3[Co(CN)_6]_2 \cdot x(L) \cdot y(ZnCl_2) \cdot z(H_2O)$ wherein L is the organic ligand, x is from about 0.5 to 10, y is from about 0.2 to 3.0, and z is from about 1.0 to 10.0.

* * * * *